US 11,761,933 B2

(12) United States Patent
Hiraoka et al.

(10) Patent No.: US 11,761,933 B2
(45) Date of Patent: Sep. 19, 2023

(54) FLUID SUPPLY DEVICE FOR FLUID CHROMATOGRAPH

(71) Applicant: SHIMADZU CORPORATION, Kyoto (JP)

(72) Inventors: Tomoki Hiraoka, Kyoto (JP); Toshiki Sano, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 548 days.

(21) Appl. No.: 17/054,980

(22) PCT Filed: Jan. 17, 2019

(86) PCT No.: PCT/JP2019/001352
§ 371 (c)(1),
(2) Date: Nov. 12, 2020

(87) PCT Pub. No.: WO2019/220686
PCT Pub. Date: Nov. 21, 2019

(65) Prior Publication Data
US 2021/0270784 A1  Sep. 2, 2021

(30) Foreign Application Priority Data

May 16, 2018  (JP) .................................. 2018-094850
Jun. 8, 2018   (JP) .................................. 2018-110593
Jun. 8, 2018   (JP) .................................. 2018-110594

(51) Int. Cl.
G01N 30/60    (2006.01)
B01D 15/14    (2006.01)
(Continued)

(52) U.S. Cl.
CPC ......... *G01N 30/6047* (2013.01); *B01D 15/14* (2013.01); *G01N 30/30* (2013.01);
(Continued)

(58) Field of Classification Search
CPC ............... G01N 30/02; G01N 30/6091; G01N 30/6047; G01N 30/30; G01N 30/32;
(Continued)

(56) References Cited

U.S. PATENT DOCUMENTS

2010/0048120 A1* 2/2010 Chuang ................... G06F 1/203
                                                    454/184
2018/0136187 A1* 5/2018 Doutt ...................... G01N 30/08

FOREIGN PATENT DOCUMENTS

JP   2010-181271 A   8/2010
JP   2015-034702 A   2/2015
(Continued)

OTHER PUBLICATIONS

Office Action dated May 9, 2022 for corresponding Chinese Application No. 201980030403.1 (English machine translation).
(Continued)

*Primary Examiner* — Benjamin R Schmitt
(74) *Attorney, Agent, or Firm* — Renner, Otto, Boisselle & Sklar, LLP

(57) ABSTRACT

A fluid supply device for a fluid chromatograph includes a storage container, a pump device, a filter, a guide and a heat dissipation device. The pump device supplies a mobile phase to a column. The storage container stores the pump device and the filter and has an intake port. The guide guides gas that has been introduced into the storage container through the intake port to the filter. A heat dissipation device dissipates heat generated from the pump device to the outside of the storage container together with the gas inside of the storage container. The storage container includes a door having a front surface directed forwardly of the fluid supply device. The intake port is provided at the door to be directed sidewardly of the fluid supply device.

8 Claims, 9 Drawing Sheets

(51) Int. Cl.
    *G01N 30/30*     (2006.01)
    *G01N 30/32*     (2006.01)
    *B01D 15/40*     (2006.01)

(52) U.S. Cl.
    CPC ............ *G01N 30/32* (2013.01); *B01D 15/40* (2013.01); *G01N 2030/326* (2013.01)

(58) Field of Classification Search
    CPC .. G01N 2030/326; G01D 11/24; B01D 15/14; B01D 15/16; B01D 15/161; B01D 2201/4023
    See application file for complete search history.

(56) References Cited

FOREIGN PATENT DOCUMENTS

| WO | WO-2014024253 A1 * | 2/2014 | ............ G01N 30/30 |
|---|---|---|---|
| WO | 2014/034336 A1 | 3/2014 | |
| WO | 2017/122259 A1 | 6/2017 | |

OTHER PUBLICATIONS

International Search Report for corresponding Application No. PCT/JP2019/001352, dated Apr. 16, 2019.
Written Opinion for corresponding Application No. PCT/JP2019/001352, dated Apr. 16, 2019 (partial English translation).
Office Action for corresponding JP Application No. 2020-518963 dated May 11, 2021, with English language translation.

* cited by examiner

FLUID SUPPLY DEVICE FOR FLUID CHROMATOGRAPH

TECHNICAL FIELD

The present invention relates to a fluid supply device for a fluid chromatograph.

BACKGROUND ART

In a fluid chromatograph such as a liquid chromatograph and a supercritical fluid chromatograph, a fluid supply device for supplying a mobile phase to a column is used. As such a fluid supply device, a liquid sending device to be used in a liquid chromatograph is described in Patent Document 1, for example. The liquid sending device includes a casing and two plunger pumps. The two plunger pumps are stored in the casing.

[Patent Document 1] WO 2017/122259 A1

SUMMARY OF INVENTION

Technical Problem

A liquid sending pump of a liquid chromatograph is generally stored in a casing as the liquid sending device of Patent Document 1. In a case where the temperature in the casing increases due to an operation of the liquid sending pump, the supply amount of the mobile phase to be supplied by the liquid sending pump may change due to a change in temperature in the casing. As such, a heat dissipation device such as a fan is provided in the casing, and an intake port for taking outside air into the casing is provided.

It is necessary to ensure a space sidewardly of the casing such that the intake port is not closed in a case where the intake port is provided in a side surface of the casing. This restricts provision of another appliance sidewardly of the casing. Further, in a case where a pump head of the liquid sending pump is arranged forwardly of the casing, it is required to form a rearward flow of gas inside of the casing in order to actively cool the pump head.

As such, the intake port is desirably provided in a front portion of the casing. However, in a case where the intake port is provided in the front portion of the casing, designability of the front portion of the fluid supply device is impaired.

An object of the present invention is to provide a fluid supply device for a fluid chromatograph that can improve designability of a front portion while an intake port is provided in the front portion.

Solution to Problem (1) A fluid supply device for a fluid chromatograph according to one aspect of the present invention includes a pump device for supplying a mobile phase to a column, a filter, a storage container that stores the pump device and the filter and has an intake port, a guide that guides gas that has been introduced into the storage container through the intake port to the filter, and a heat dissipation device that dissipates heat generated from the pump device to outside of the storage container together with gas inside of the storage container, wherein the storage container includes a front surface member having a front surface directed in a first direction, and the intake port is provided at the front surface member to be directed in a second direction that intersects with the first direction.

In the fluid supply device, heat generated in the storage container due to an operation of the pump device is dissipated by the heat dissipation device to the outside of the storage container together with gas in the storage container. At this time, gas introduced into the storage container through the intake port is guided to the filter, whereby particles or the like are prevented from adhering to the pump device stored in the storage container.

In the above-mentioned configuration, because the intake port is directed in the second direction that intersects with the first direction, the intake port is unlikely to be seen in a case where the fluid supply device is viewed from a position farther forward than the front surface member. Therefore, designability of the front portion of the fluid supply device can be improved while the intake port is provided in a front portion of the fluid supply device.

(2) The storage container may further include a casing having a front surface opening, and a door that closes and opens at least a partial area of the front surface opening and the front surface member is the door.

In this case, designability of the door provided in the front portion of the fluid supply device can be improved.

(3) The door may have the front surface, a first side portion and a second side portion, the first side portion may be provided at the casing to be turnable, and the intake port may be provided at the second side portion.

In this case, the user can open and close the door by inserting his or her finger into the intake port and holding the second side portion. Thus, it is not necessary to provide a holder such as a handle for opening and closing the door to be held by the user at the door. Therefore, a reduction in designability of the door is suppressed.

(4) The fluid supply device for a fluid chromatograph may further include a holding member that attachably and detachably holds the filter at the door.

In this case, the user can easily replace the filter by opening the door.

(5) The holding member may have a snap-fit mechanism and may be configured to be attachable to and detachable from the door by the snap-fit mechanism.

In this case, the user can easily attach the holding member to and detach the holding member from the door.

(6) The holding member may include the guide, and the guide may guide gas that has flowed in a direction opposite to the second direction through the intake port to the filter held by the holding member.

In this case, because the holding member that holds the filter also serves as a guide that guides gas to the filter, the number of components is reduced.

(7) The front surface member may have an inner surface opposite to the front surface, and the filter may be a plate-shape member having a ventilation plane, and the ventilation plane may be arranged to face an inner surface of the front surface member.

In this case, because the ventilation plane of the filter faces the inner surface of the front surface member, it is possible to prevent the filter from being exposed forwardly of the storage container without reducing an area of the ventilation plane of the filter. Therefore, a reduction in designability of the front portion of the fluid supply device due to the filter is suppressed, and a reduction in heat dissipation efficiency is suppressed because a cross section of the flow path of gas that passes through the filter is largely ensured.

(8) The intake port may be provided at the front surface member not to be seen in a case where the front surface member is viewed in a direction opposite to the first direction.

In this case, designability of the front portion of the fluid supply device is further improved.

DESCRIPTION OF EMBODIMENTS

[1] Basic Configuration of Fluid Supply Device for Fluid Chromatograph

Figure 1:
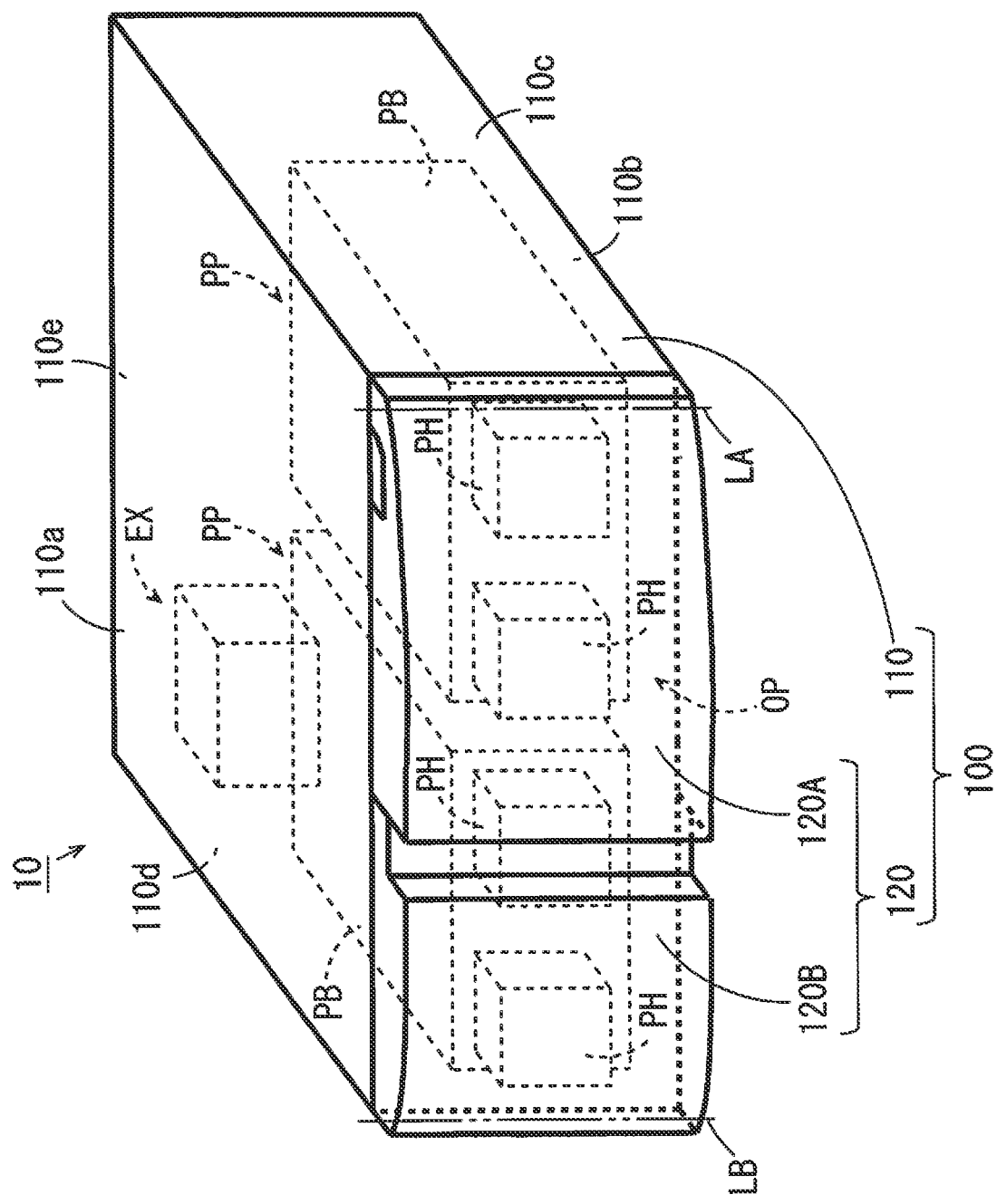
FIG. 1 is an external perspective view of a liquid sending device according to one embodiment of the present invention.

A liquid sending device for a liquid chromatograph will be described as one example of a fluid supply device for a fluid chromatograph according to one embodiment of the present invention. FIG. 1 is an external perspective view of the liquid sending device according to the one embodiment.

As shown in FIG. 1, the liquid sending device 10 of the present example has the configuration in which a plurality (two in the present example) of pump devices PP, a heat dissipation device EX, a power supply circuit (not shown) and the like are stored in a storage container 100. The storage container 100 has a substantially cuboid shape and includes a casing 110 and a bi-parting door 120. The casing 110 includes an upper wall 110a, a lower wall 110b, one sidewall 110c, another sidewall 110d and an end surface wall 110e.

The upper wall 110a and the lower wall 110b are formed to face each other in an up-and-down direction. The one sidewall 110c connects one side of the upper wall 110a to one side of the lower wall 110b, the other sidewall 110d connects another side of the upper wall 110a to another side of the lower wall 110b and the one sidewall 110c and the other sidewall 110d are formed to face each other. The end surface wall 110e is perpendicular to the upper wall 110a, the lower wall 110b, the one sidewall 110c and the other sidewall 110d, and is connected to the ends of the upper wall 110a, the lower wall 110b, the one sidewall 110c and the other sidewall 110d. The casing 110 has an opening OP in a portion opposite to the end surface wall 110e.

The bi-parting door 120 includes doors 120A, 120B. The door 120A closes and opens the area from the one sidewall 110c to substantially the center of the opening OP in the opening OP of the casing 110. The door 120A may be provided at the one sidewall 110c to be turnable around a turning axis LA extending in the up-and-down direction.

The door 120B closes and opens the area from the other sidewall 110d to substantially the center of the opening OP in the opening OP of the casing 110. The door 120B is provided at the other sidewall 110d to be turnable around the turning axis LB extending in the up-and-down direction.

In the following description, the bi-parting door 120 and its peripheral portions of the liquid sending device 10 of FIG. 1 are referred to as a front portion of the liquid sending device 10, and the end surface wall 110e and its peripheral portions of the liquid sending device 10 are referred to as a rear portion of the liquid sending device 10. Further, the direction directed from the inside of the storage container 100 toward the front portion of the liquid sending device 10 is referred to as forward, and the direction directed from the inside of the storage container 100 toward the rear portion of the liquid sending device 10 is referred to as rearward. The door 120A is equivalent to a front surface member according to the present invention. Further, the outer surface of the door 120A directed forwardly of the liquid sending device 10 is equivalent to a front surface of the storage container according to the present invention.

Each of the two pump devices PP has the configuration in which one pump motor (not shown) and two pump heads PH are assembled into one pump body PB. In each pump device PP, two plungers (not shown) are provided in each of the two pump heads PH. The pump motor drives the two plungers in the two pump heads PH by receiving power from the power supply circuit (not shown) (a double plunger system). This causes each plunger to reciprocate in the pump head PH.

In each pump device PP, the two pump heads PH are located in the front portion of the liquid sending device 10 inside of the storage container 100, and the pump body PB is located at a position farther rearward than the two pump heads PH in the liquid sending device 10. Thus, when the bi-parting door 120 is closed, each pump head PH is close to the inner surface of the bi-parting door 120.

The heat dissipation device EX includes a heat dissipating fan and a fan motor that drives the heat dissipating fan and dissipates heat generated in the storage container 100 to the outside of the storage container 100 together with gas inside of the storage container 100. The heat generated in the storage container 100 includes heat generated from the pump motor and the power supply circuit when the pump device PP is operated.

The storage container 100 is provided with an intake port for taking gas outside of the storage container 100 into the storage container 100 when heat is dissipated by the heat dissipation device EX. Further, the storage container 100 is provided with an exhaust port for exhausting gas inside of the storage container 100 to the outside of the storage container 100 when heat is dissipated by the heat dissipation device EX.

Figure 2:
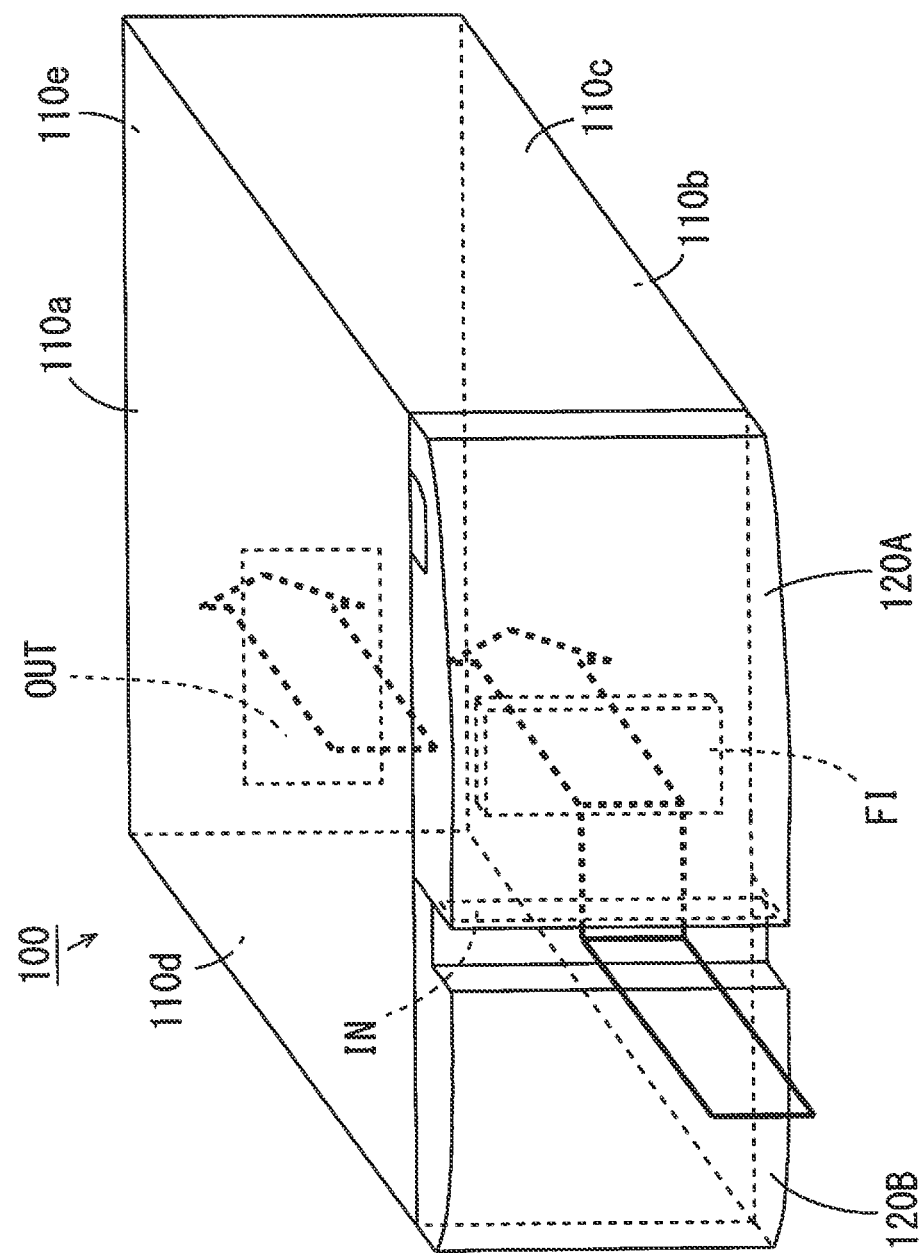
FIG. 2 is a schematic diagram showing a flow of gas in a storage container when heat is dissipated by a heat dissipation device of FIG. 1.

FIG. 2 is a schematic diagram showing a flow of gas in the storage container 100 when heat is dissipated by the heat dissipation device EX of FIG. 1. As shown in FIG. 2, in the liquid sending device 10 according to the present embodiment, the door 120A is provided with the intake port IN directed sidewardly of the liquid sending device 10. A filter FI is provided inwardly of the door 120A. Further, the exhaust port OUT is provided in the end surface wall 110e. The filter FI of the present example is a rectangular plate-shape member, and its one surface and the other surface function as a ventilation plane.

When heat is dissipated by the heat dissipation device EX of FIG. 1, gas flows smoothly and rearwardly inside of the storage container 100 as indicated by the thick solid lines and the thick dotted and outlined arrows in FIG. 2. At this time, gas that enters through the intake port IN from the outside of the storage container 100 is cleaned by passing through the filter FI. Thus, particles or the like outside of the storage container 100 are prevented from adhering to the pump devices PP in the storage container 100.

[2] Details of Configuration of Door 120A and its Peripheral Members

Figure 3:
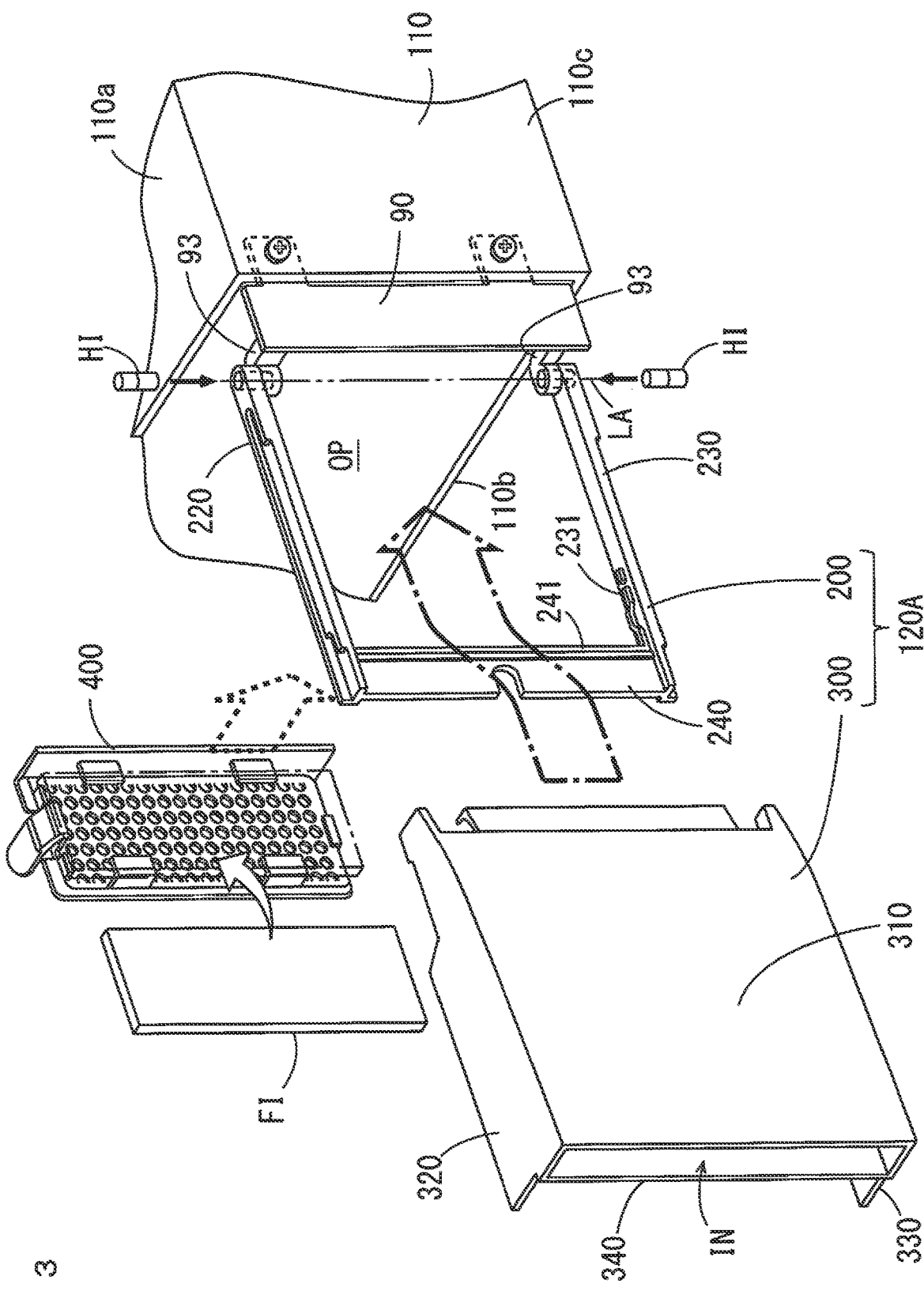
FIG. 3 is an exploded perspective view for explaining the configuration of a door and its peripheral members of FIG. 1.

The door 120A of FIG. 1 is provided at the one sidewall 110c of the casing 110 by a door attachment. The configuration of the door 120A will be described together with the door attachment. FIG. 3 is an exploded perspective view for explaining the configuration of the door 120A and its peripheral members of FIG. 1. As shown in FIG. 3, the door attachment 90 having a substantially elongated plate shape is fixed to the front end of the one sidewall 110c of the casing 110 to extend the one sidewall 110c forwardly. Hinge attachment portions 93 are respectively provided in the vicinity of the upper and lower ends of the door attachment 90. Each hinge attachment portion 93 is formed to extend from the door attachment 90 to the space forward of the opening OP.

The door 120A includes a frame member 200 and a cover member 300. The frame member 200 is a single member formed of metal such as an aluminum alloy and is constituted by an upper frame 220, a lower frame 230 and a frame coupler 240. The upper frame 220 and the lower frame 230 respectively have a substantially prismatic shape, are arranged to extend in parallel with each other and be opposite to each other. The frame coupler 240 has a substantially elongated plate shape and couples one end of the upper frame 220 and one end of the lower frame 230 to each other.

The other end of the upper frame 220 is connected to the upper hinge attachment portion 93 via a hinge HI, and the other end of the lower frame 230 is connected to the lower hinge attachment portion 93 via a hinge HI. At this time, in each hinge HI, its axial center is located on the turning axis LA. Thus, the frame member 200 is attached to the door attachment 90 by the upper and lower hinges HI to be turnable around the turning axis LA.

The cover member 300 is a single member formed of resin, for example, and includes a lid 310, an upper wall 320 and a lower wall 330. The cover member 300 is attached to the frame member 200 as indicated by the thick one-dot and dash outlined arrow in FIG. 3.

As indicated by the thick dotted and outlined arrow in FIG. 3, a holding member 400 is attached to the frame member 200 in addition to the cover member 300. The holding member 400 attachably and detachably holds the filter FI of FIG. 2 at the frame member 200. Details of the holding member 400 will be described below.

In the following description, the side portion close to the turning axis LA of the both sides of the door 120A is referred to as one side portion of the door 120A, and the side portion opposite to the one side portion is referred to as another side portion of the door 120A. Further, the surface directed inwardly of the casing 110 (rearwardly of the liquid sending device 10) when the door 120A is closed is referred to as an inner surface of the door 120A. Further, the direction in which the inner surface of the door 120A is directed is referred to as rearward of the door 120A, and its opposite direction is referred to as forward of the door 120A.

Figure 4:
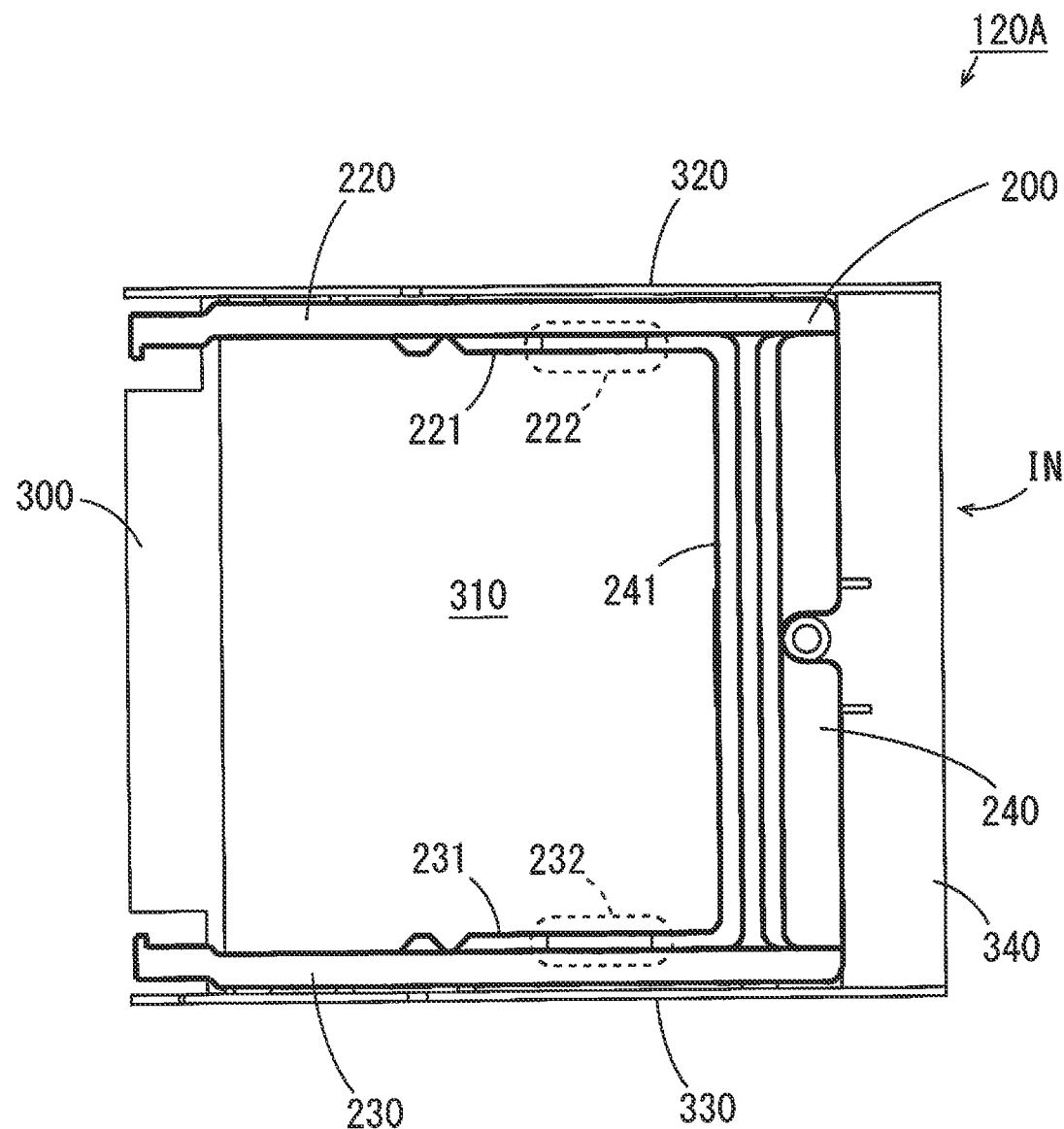
FIG. 4 is a back view of the door.

FIG. 4 is a back view of the door 120A. In FIG. 4, in order to facilitate understanding of the shapes of the frame member 200 and the cover member 300, the frame member 200 is indicated by the thick solid lines, and the cover member 300 is indicated by the thin solid lines.

As shown in FIGS. 3 and 4, the lid 310 has a substantially rectangular plate shape and is formed to be gently curved in a horizontal direction from the one side portion to the other side portion of the door 120A. The upper wall 320 has a plate shape extending rearwardly from the upper edge of the lid 310, and the lower wall 330 has a plate shape extending rearwardly from the lower edge of the lid 310.

The upper wall 320 covers the upper frame 220 from above, and the lower wall 330 covers the lower frame 230 from below. When the door 120A is closed, the lid 310 covers the frame member 200 and the door attachment 90 as well as part of the opening OP from the front of the liquid sending device 10.

A cover coupler 340 having a substantially elongated plate shape is formed at a portion of the cover member 300 located at the other side portion of the door 120A to connect the upper wall 320 and the lower wall 330 to each other. The cover coupler 340 is opposite to the inner surface of the lid 310 with a certain distance therebetween and adjacent to the frame coupler 240 in the horizontal direction. The intake port IN of FIG. 2 is formed by the lid 310, the upper wall 320, the lower wall 330 and the cover coupler 340.

Protrusions 221, 231, 241 for provision of the filter FI of FIG. 2 at the door 120A are respectively formed at the upper frame 220, the lower frame 230 and the frame coupler 240 of the frame member 200.

Specifically, the protrusion 221 of the upper frame 220 protrudes from the lower surface of the upper frame 220 by a predetermined distance and extends from the upper end of the frame coupler 240 to substantially the center of the upper frame 220. Part of the protrusion 221 is meandering. A meandering portion of the protrusion 221 functions as an engaged portion 222 corresponding to a snap-fit mechanism 430 (FIG. 5), described below, of the holding member 400 (FIG. 3).

Further, the protrusion 231 of the lower frame 230 protrudes from the upper surface of the lower frame 230 by a predetermined distance and extends from the lower end of the frame coupler 240 to substantially the center of the lower frame 230. Part of the protrusion 231 is meandering. A meandering portion of the protrusion 231 functions as an engaged portion 232 corresponding to an engaging portion 490 (FIG. 5), described below, of the holding member 400 (FIG. 3).

Further, the protrusion 241 of the frame coupler 240 protrudes from the side surface directed toward the one side portion of the door 120A by a predetermined height and extends linearly from the upper end to the lower end of the frame coupler 240.

Figure 5:
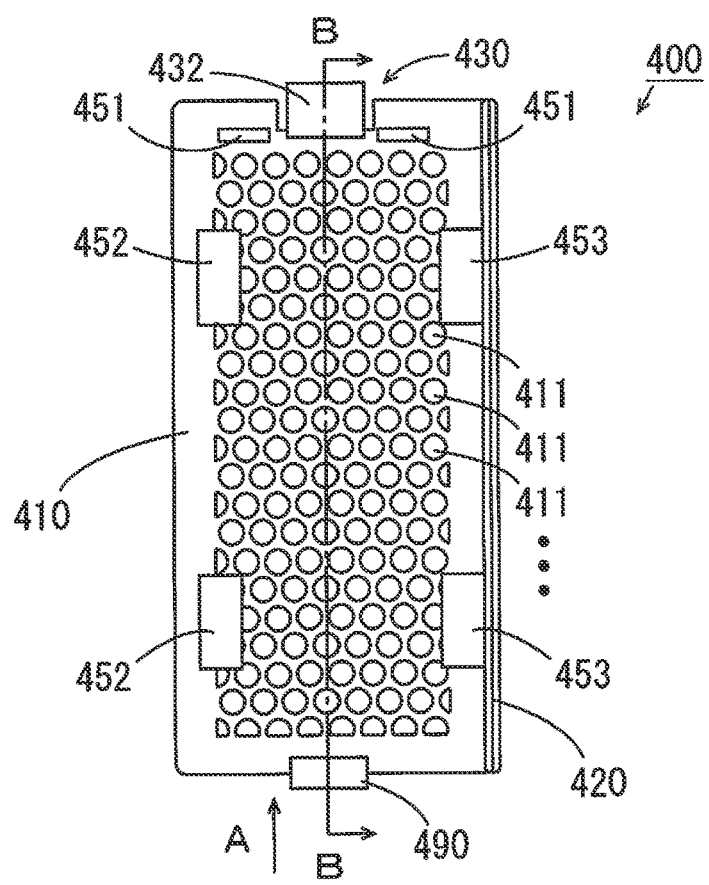
FIG. 5 is a front view of a holding member.
Figure 6:
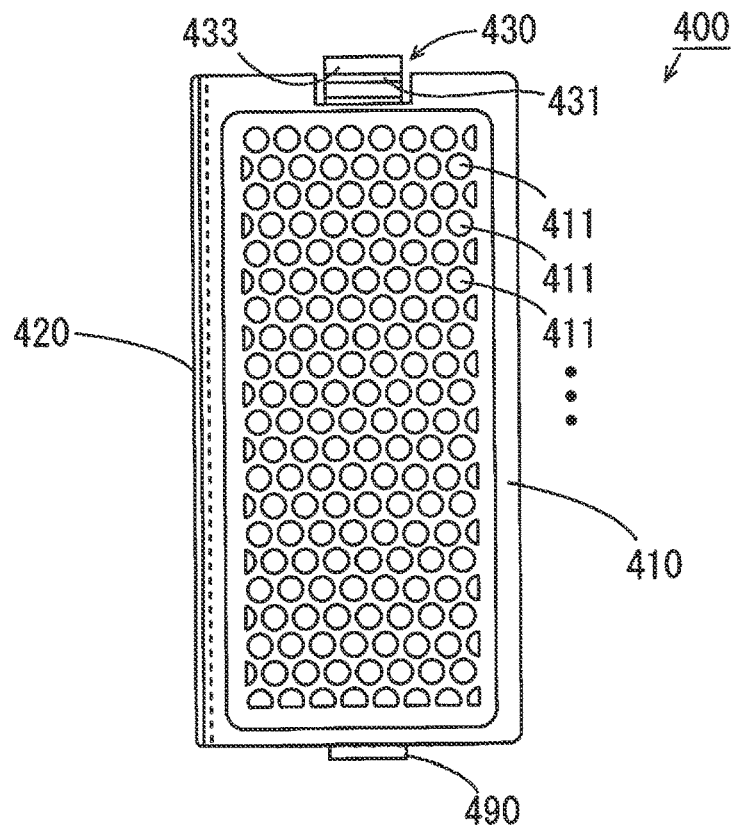
FIG. 6 is a back view of the holding member.
Figure 7:
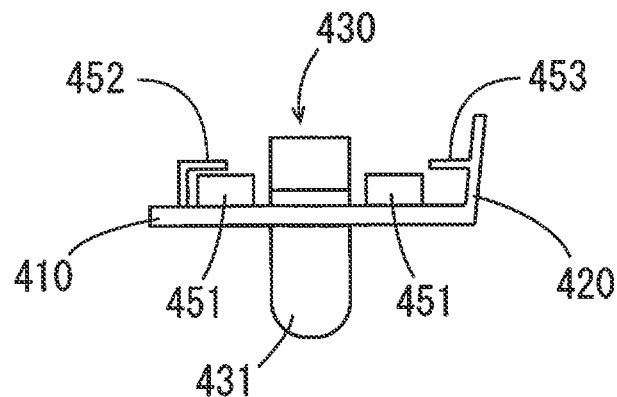
FIG. 7 is a diagram of the holding member as viewed in the direction of the arrow A of FIG. 5.
Figure 8:
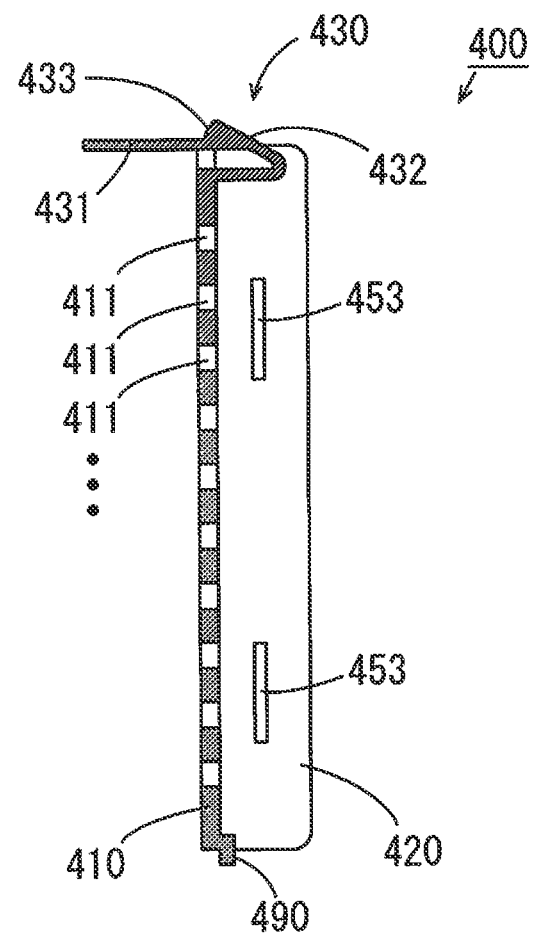
FIG. 8 is a cross sectional view taken along the line B-B of FIG. 5.

Next, the holding member 400 will be described. FIG. 5 is a front view of the holding member 400, FIG. 6 is a back view of the holding member 400, FIG. 7 is a diagram of the holding member 400 as viewed in the direction of the arrow A of FIG. 5, and FIG. 8 is a cross sectional view taken along the line B-B of FIG. 5. The scale of the holding member 400 shown in FIGS. 5 to 8 is different from the scale of the diagrams in FIG. 4 and FIGS. 9 to 11, described below.

The holding member 400 is a single member formed of resin, for example, and has a substantially rectangular plate-shape main body 410 extending in the up-and-down direction as shown in FIG. 5. In the plate-shape main body 410, a large number of through holes 411 are formed in a central area except for the portion extending from its outer edge by a certain width.

As shown in FIG. 7, a guide 420 is formed to extend forwardly from one side of the plate-shape main body 410. The guide 420 has an elongated plate shape and extends from the upper end to the lower end of the plate-shape main body 410 as shown in FIG. 8.

Two holding pieces 453 are provided at the guide 420 to be arranged in the up-and-down direction at intervals. Each holding piece 453 protrudes in the direction directed from the guide 420 to the other side of the plate-shape main body 410 as shown in FIG. 7 at a position spaced apart from the plate-shape main body 410 by a predetermined distance.

As shown in FIG. 5, two holding pieces 452 are provided in the vicinity of the other side of the plate-shape main body 410 to be arranged in the up-and-down direction at intervals. Each holding piece 452 has an L-shape cross section, and protrudes forwardly from the plate-shape main body 410 by a predetermined distance and is further bent in the direction directed toward the guide 420 as shown in FIG. 7.

As shown in FIG. 5, two holding pieces 451 are provided in the vicinity of the upper end of the plate-shape main body 410 to be arranged in the horizontal direction at intervals. Each holding piece 451 protrudes forwardly from the plate-shape main body 410 by a predetermined distance.

Here, the above-mentioned predetermined distance is equal to the thickness of the filter FI or slightly larger than the thickness of the filter FI, for example. Thus, in the holding member 400, the filter FI of FIG. 2 can be held on one surface of the plate-shape main body 410 by the plurality of holding pieces 451, 452, 453.

The snap-fit mechanism 430 is provided at the center of the upper end of the plate-shape main body 410. In the present embodiment, a snap-fit is the coupling method of two members respectively having an engaging portion and an engaged portion, and is the method of using elastic deformation of at least one member out of the engaged portion and the engaging portion and fixing the two members. As shown in FIG. 8, the snap-fit mechanism 430 is formed to extend forwardly from the upper end of the plate-shape main body 410, be curved obliquely, upwardly and rearwardly and further extend horizontally to a position farther rearward than the plate-shape main body 410.

The snap-fit mechanism 430 of the present example has a holder 431, a tapered portion 432 and an engaging portion 433. The holder 431 is a rear end portion of the snap-fit mechanism 430 and extends horizontally at a position farther rearward than the plate-shape main body 410. The tapered portion 432 is the tip of the snap-fit mechanism 430 and its peripheral portions and has an outer surface extending forwardly and downwardly above the plate-shape main body 410. The engaging portion 433 is the upper end of the snap-fit mechanism 430 and its peripheral portions, is located between the holder 431 and the tapered portion 432 and has an outer surface directed rearwardly.

The engaging portion 490 is provided at the center of the lower end of the plate-shape main body 410. The engaging portion 490 protrudes downwardly from the one surface of the plate-shape main body 410.

When the holding member 400 is to be attached to the frame member 200, the user arranges the engaging portion 490 of the holding member 400 at a position farther forward than the engaged portion 232 of the frame member 200 from a position farther rearward than the door 120A of FIG. 4. Further, the user pushes the snap-fit mechanism 430 into the engaged portion 222 of the frame member 200 from a position farther rearward than the door 120A while holding the holder 431.

In this case, the tapered portion 432 of the snap-fit mechanism 430 slides on the engaged portion 222 of the frame member 200, whereby the snap-fit mechanism 430 is elastically deformed, and the tapered portion 432 moves to a position farther forward than the engaged portion 222. At this time, one portion of the one surface of the plate-shape main body 410 directed forwardly abuts against the protrusions 221, 231, 241 of the frame member 200. In this state, the engaged portion 222 of the frame member 200 is engaged with the engaging portion 433 of the snap-fit mechanism 430. Further, the engaged portion 232 of the frame member 200 is engaged with the engaging portion 490 of the holding member 400. Thus, the holding member 400 is attached to the frame member 200 to be fixed.

Figure 9:
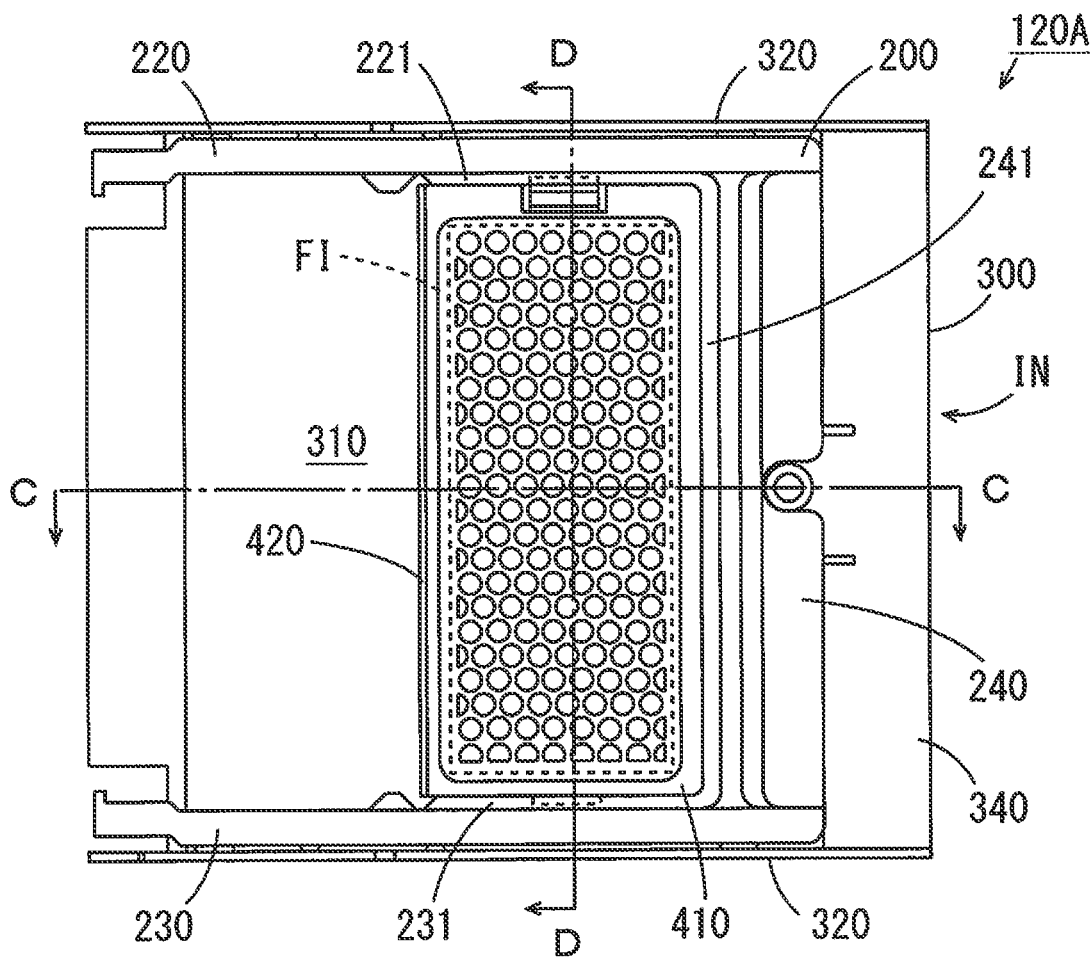
FIG. 9 is a back view of the door to which the holding member is attached.
Figure 10:
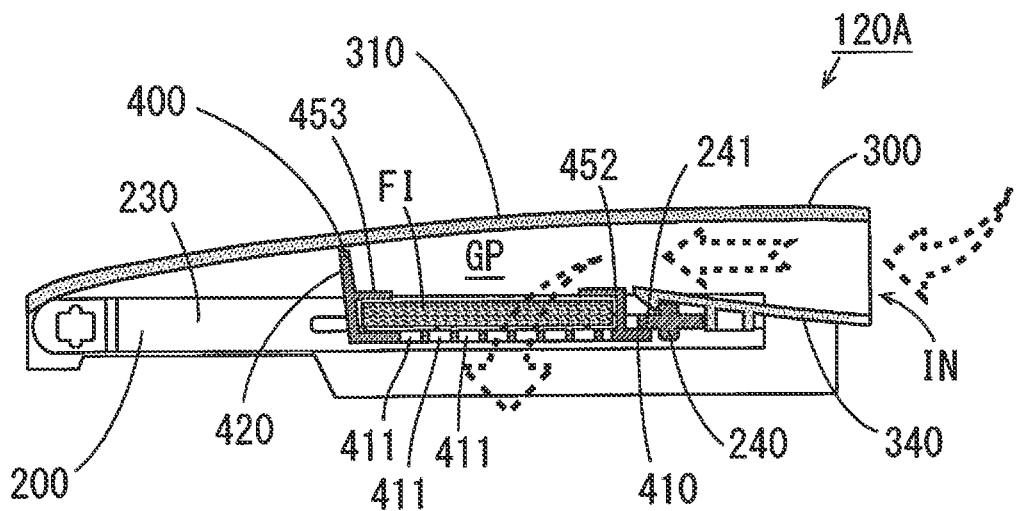
FIG. 10 is a cross sectional view taken along the line C-C of FIG. 9.
Figure 11:
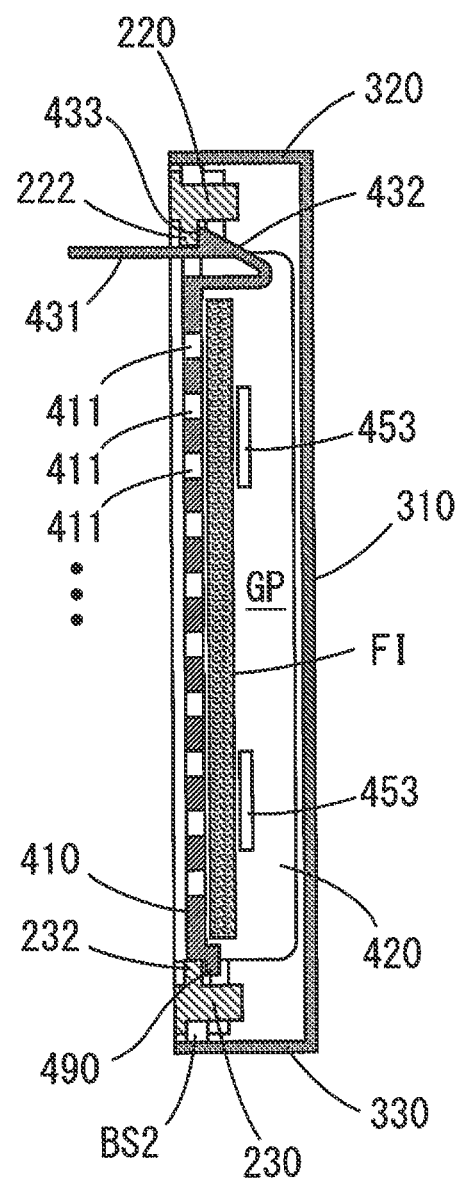
FIG. 11 is a cross sectional view taken along the line D-D of FIG. 9.

FIG. 9 is a diagram of the door 120A in which the holding member 400 is attached to the frame member 200 as viewed from a position farther rearward than the door 120A, FIG. 10 is a cross sectional view taken along the line C-C of FIG. 9 and FIG. 11 is a cross sectional view taken along the line D-D of FIG. 9.

As shown in FIG. 9, with the holding member 400 attached to the frame member 200, the plate-shape main body 410 of the holding member 400 is adjacent to the frame coupler 240 of the frame member 200 in the horizontal direction.

In this case, as shown in FIG. 10, a gas passage GP is formed between the cover coupler 340 of the cover member 300, the frame coupler 240 of the frame member 200 and the plate-shape main body 410 of the holding member 400, and the lid 310 of the cover member 300. At this time, as shown in FIGS. 10 and 11, the guide 420 of the holding member 400 extends from the one side of the plate-shape main body 410 to the inner surface of the lid 310.

Thus, as indicated by the thick-dotted and outlined arrows in FIG. 10, the guide 420 guides gas outside of the storage container 100 flowing into the gas passage GP from the intake port IN to the filter FI held by the holding member 400. In this manner, because the holding member 400 according to the present embodiment has the guide 420, it is not necessary to provide a member for guiding gas outside of the storage container 100 to the filter FI separately from a member for holding the filter FI in the liquid sending device 10. Therefore, the number of components of the door 120A is reduced.

When detaching the holding member 400 holding the filter FI from the frame member 200, the user pulls out the holder 431 of the holding member 400 rearwardly of the door 120A while pressing the holder 431 of the holding member 400 downwardly from a position farther rearward than the door 120A of FIG. 4. Thus, the engaging state of the snap-fit mechanism 430 with the engaged portion 232 of the frame member 200 is released, and the holding member 400 is detached rearwardly of the frame member 200.

As described above, the holding member 400 is configured to be attachable to and detachable from the door 120A by the snap-fit mechanism 430. Thus, the user can easily attach the holding member 400 to and detach the holding member 400 from the door 120A without using a tool or the like by opening the door 120A. This facilitates replacement of the filter FI.

[3] Effects (a) In the above-mentioned liquid sending device 10, heat generated in the storage container 100 by an operation of the pump device PP is dissipated by the heat dissipation device EX to the outside of the storage container 100 together with gas in the storage container 100. At this time, gas introduced into the storage container 100 through the intake port IN is guided to the filter FI, whereby particles or the like are prevented from adhering to the pump devices PP stored in the storage container 100.

In the front portion of the liquid sending device 10, the intake port IN provided at the door 120A is directed sidewardly of the liquid sending device 10. That is, the intake port IN is formed to be directed in the direction that intersects with the direction directed forwardly of the liquid sending device 10. Thus, in a case where the liquid sending device 10 is viewed from a position farther forward than the liquid sending device 10, the intake port IN is unlikely to be seen. Therefore, designability of the door 120A provided in the front portion of the liquid sending device 10 can be improved while the intake port IN is provided in the front portion of the liquid sending device 10.

(b) In the door 120A, the intake port IN is provided at the other side portion that is opposite to the one side portion attached to the one sidewall 110c of the casing 110 to be turnable. In this case, the user can open and close the door 120A by inserting his or her finger into the intake port IN and holding the other side portion of the door 120A. Thus, it is not necessary to provide a holder such as a handle for opening and closing the door to be held by the user at the door 120A. Therefore, a reduction in designability of the door 120A is suppressed.

(c) The filter FI is arranged such that its ventilation plane faces the inner surface of the door 120A while being attached to the door 120A by the holding member 400. In this case, it is possible to prevent the filter FI from being exposed forwardly of the storage container 100 without reducing an area of the ventilation plane of the filter FI. Therefore, a reduction in designability of the front portion of the liquid sending device 10 caused by the filter FI is suppressed, and a reduction in heat dissipation efficiency is suppressed because a cross section of the flow path of gas passing through the filter FI is largely ensured.

[4] Liquid Chromatograph

Figure 12:
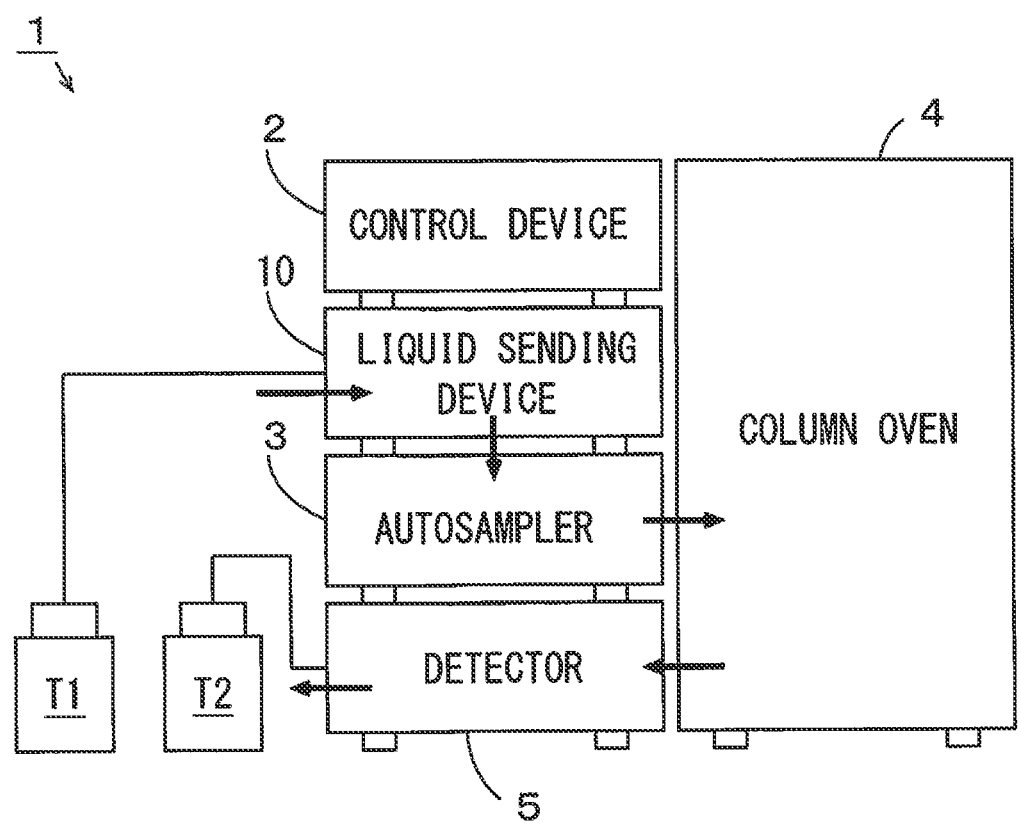
FIG. 12 is a schematic diagram showing one example of the configuration of a liquid chromatograph including the liquid sending device of FIG. 1.

FIG. 12 is a schematic diagram showing the configuration of one example of a liquid chromatograph including the liquid sending device 10 of FIG. 1. The liquid chromatograph 1 of the present example includes a control device 2, an autosampler 3, a column oven 4 and a detector 5 in addition to the liquid sending device 10 of FIG. 1.

The liquid sending device 10 supplies a mobile phase stored in a mobile phase container T1 to a column provided in the column oven 4. The autosampler 3 injects a liquid sample into the mobile phase supplied from the liquid sending device 10 to the column. The column oven 4 keeps the temperature of the column provided in the column oven 4 at a substantially constant temperature. The detector 5 detects each component of the liquid sample separated by the column. The mobile phase that has passed through the detector 5 is sent to a liquid waste container T2. The control device 2 includes a CPU and a memory, for example, and controls the operation of each element that constitutes the liquid chromatograph 1.

Because the liquid chromatograph 1 of the present example has the liquid sending device 10 of FIG. 1, the mobile phase is supplied to the column with high accuracy. Further, a reduction in designability of the front portion of the liquid chromatograph 1 due to designability of the front portion of the liquid sending device 10 is prevented.

[5] Other Embodiments (a) While the liquid sending device 10 that is one example of the fluid supply device for a fluid chromatograph according to the present invention is used in a liquid chromatograph in the above-mentioned embodiment, the present invention is not limited to this. The configurations of the door 120A and the holding member 400 provided in the above-mentioned liquid sending device 10 are not limited to be used in the liquid sending device 10 for a liquid chromatograph and may be used in a fluid supply device for a supercritical fluid chromatograph. Even in this case, the effects similar to those of the example of the above-mentioned embodiment can be obtained.

(b) While the bi-parting door 120 is provided in the front portion of the storage container 100 in the liquid sending device 10 according to the above-mentioned embodiment, the present invention is not limited to this. A wall having a front surface directed forwardly of a liquid sending device 10 may be formed in a front portion of a storage container 100 instead of the bi-parting door 120. In this case, an intake port IN directed sidewardly of the wall is formed, whereby designability of a front portion of the liquid sending device 10 can be improved while the intake port IN is provided in the front portion of the liquid sending device 10.

(c) In the above-mentioned embodiment, when the bi-parting door 120 is closed, the intake port IN opens to be directed in the direction perpendicular to the direction directed forwardly of the liquid sending device 10 from the inside of the storage container 100. More specifically, the intake port IN opens to be directed sidewardly of the liquid sending device 10. However, the direction in which the intake port IN opens is not limited to the above-mentioned example.

In the door 120A, the intake port IN may open to be directed in the direction that intersects with the direction directed forwardly of the liquid sending device 10 from the inside of the storage container 100. Therefore, the intake port IN may be formed to open upwardly of the liquid sending device 10 or may be formed to open downwardly of the liquid sending device 10. In this case, in a case where the bi-parting door 120 is viewed from a position farther forward than the liquid sending device 10, the intake port IN is provided preferably not to be seen.

The intake port IN may be formed to open obliquely and forwardly of the liquid sending device 10. Also in this case, desirability of the front portion of the liquid sending device 10 can be improved as compared to the case where the intake port IN opens forwardly of the liquid sending device 10.

(d) While the filter FI is constituted by a plate-shape member in the above-mentioned embodiment, the present invention is not limited to this. The filter FI may have a shape other than a plate shape. For example, the filter FI may be columnar or cubic.

(e) While the holding member 400 is provided attachably and detachably at the frame member 200 by the snap-fit mechanism 430 in the above-mentioned embodiment, the present invention is not limited to this. The holding member 400 may be configured to be attachable to and detachable from at least one of the frame member 200 and the cover member 300 with a screw.

(f) The filter FI may be directly attached to the door 120A with a screw. In this case, the holding member 400 is not required.

(g) The storage container 100 may include a single opening door instead of the bi-parting door 120. In this case, the single opening door has the configuration similar to that of the above-mentioned door 120A, whereby the effects similar to those of the example of the above-mentioned embodiment can be obtained.

(h) The door 120A may be provided at the upper wall 110a or the lower wall 110b to turn around the turning axis LA in parallel with the horizontal direction.

(i) The door 120B of the above-mentioned bi-parting door 120 may have the configuration similar to that of the door 120A. Further, the filter FI may be held at the door 120B by the holding member 400. In this case, a flow path of gas from the outside to the inside of the storage container 100 can be more largely ensured. Thus, heat dissipation efficiency is improved.

(j) While the liquid sending device 10 according to the above-mentioned embodiment has the configuration in which the two pump devices PP are stored in the storage container 100, the configuration of the liquid sending device 10 is not limited to the above-mentioned example. For example, a liquid sending device 10 may have the configuration in which only one pump device PP is stored in the storage container 100. In this case, the liquid sending device 10 in which only one pump device PP is stored in a storage container 100 may be used in the liquid chromatograph 1 of FIG. 12. Alternatively, a liquid sending device in which a liquid supply device having the configuration different from that of the above-mentioned pump device PP is stored in a storage container 100 may be used in the liquid chromatograph 1 of FIG. 12. In this case, the liquid supply device may include a pump type that is different from a gear pump, a vane pump or a diaphragm pump, for example.

[6] Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained.

In the above-mentioned embodiment, the direction directed forwardly of the liquid sending device 10 from the inside of the storage container 100 is an example of a first direction, the direction directed toward one side of the liquid sending device 10 is an example of a second direction, the one side portion of the door 120A attached to the casing 110 to be turnable is an example of a first side portion of a door and the other side of the door 120A at which the intake port IN is provided is an example of a second side portion of a door.

As each of constituent elements recited in the claims, various other elements having configurations or functions described in the claims can be also used.

The invention claimed is:

1. A fluid supply device for a fluid chromatograph comprising:
   a pump device for supplying a mobile phase to a column;
   a filter;
   a storage container that stores the pump device and the filter and has an intake port;
   a guide that guides gas that has been introduced into the storage container through the intake port to the filter; and
   a heat dissipation device that dissipates heat generated from the pump device to the outside of the storage container together with gas inside of the storage container, wherein
   the storage container includes a front surface member having a front surface facing a first direction, and
   the intake port is provided at the front surface member facing a second direction that intersects with the first direction.

2. The fluid supply device for a fluid chromatograph according to claim 1, wherein
   the storage container further includes
   a casing having a front surface opening, and
   a door that closes and opens at least a partial area of the front surface opening, and
   the front surface member is the door.

3. The fluid supply device for a fluid chromatograph according to claim 2, wherein
   the door has the front surface, a first side portion and a second side portion,
   the first side portion is provided at the casing to be turnable, and
   the intake port is provided at the second side portion.

4. The fluid supply device for a fluid chromatograph according to claim 2, further comprising a holding member that attachably and detachably holds the filter at the door.

5. The fluid supply device for a fluid chromatograph according to claim 4, wherein
   the holding member has a snap-fit mechanism and is configured to be attachable to and detachable from the door by the snap-fit mechanism.

6. The fluid supply device for a fluid chromatograph according to claim 4, wherein
   the holding member includes the guide, and
   the guide guides gas that has flowed in a direction opposite to the second direction through the intake port to the filter held by the holding member.

7. The fluid supply device for a fluid chromatograph according to claim 1, wherein
   the front surface member has an inner surface opposite to the front surface, and
   the filter is a plate-shape member having a ventilation plane, and the ventilation plane is arranged to face an inner surface of the front surface member.

8. The fluid supply device for a fluid chromatograph according to claim 1, wherein
   the intake port is provided at the front surface member not to be seen in a case where the front surface member is viewed in a direction opposite to the first direction.

* * * * *